July 4, 1950 — R. C. SWIGERD — 2,513,689
FISHING REEL
Filed May 24, 1947 — 2 Sheets-Sheet 1
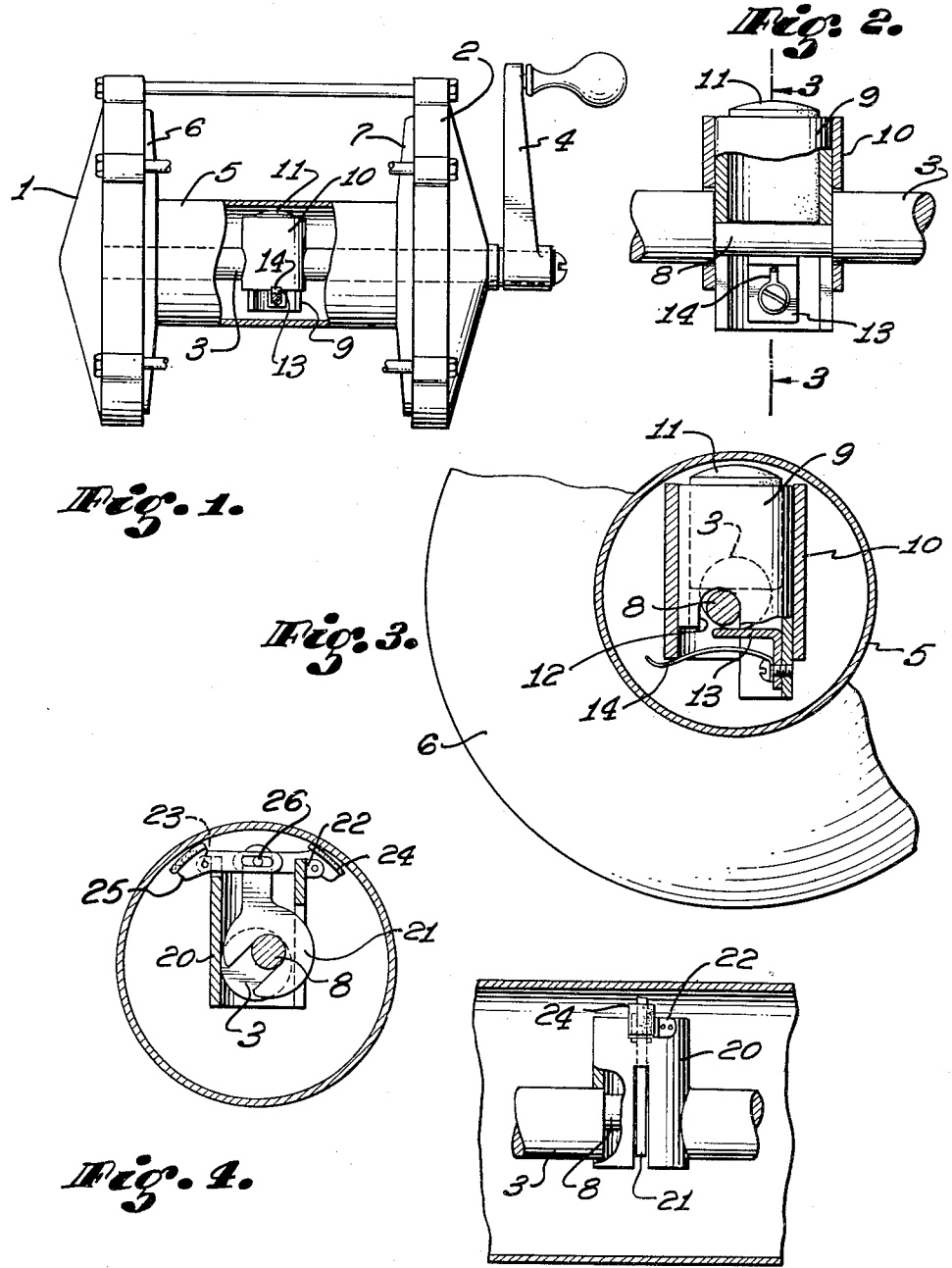
INVENTOR:
ROBERT C. SWIGERD
BY OO Martin
ATTORNEY.

July 4, 1950          R. C. SWIGERD          2,513,689
FISHING REEL
Filed May 24, 1947          2 Sheets-Sheet 2
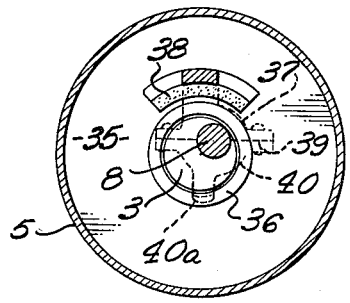
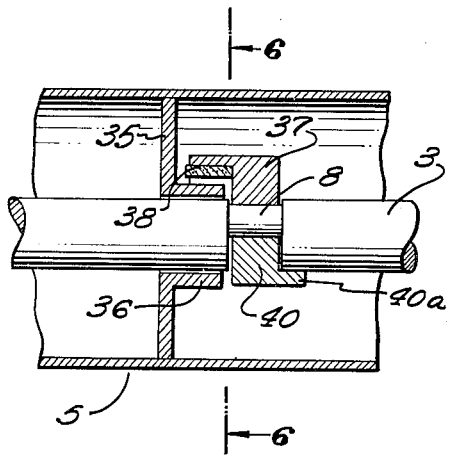
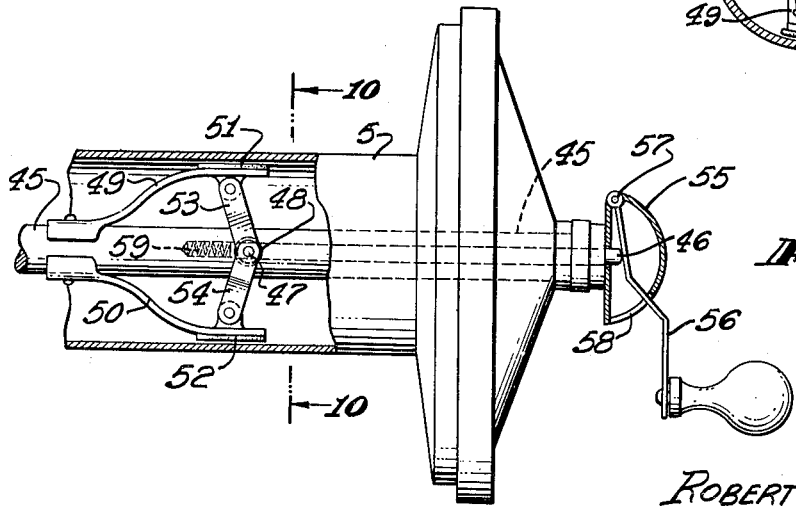
INVENTOR:
ROBERT C. SWIGERD
BY
O O Martin
ATTORNEY Patented July 4, 1950

2,513,689

UNITED STATES PATENT OFFICE 2,513,689

FISHING REEL

Robert C. Swigerd, Los Angeles, Calif.

Application May 24, 1947, Serial No. 750,189

5 Claims. (Cl. 242—84.5)

This invention relates to fishing reels of the type in which means is provided for applying pressure to the spool to control the speed of the unwinding thereof as the pull on the line increases. In fishing reels of the type referred to, it is customary to rotate the spool by means of a hand crank through a chain of gears designed to increase the speed of rotation of the spool relative to the hand crank. It is furthermore a common practice to provide additional means for applying pressure to the drum for braking purposes, independently of the hand crank. Such double operation is objectionable for the reason that it is often required to perform the two operations in such quick succession that it is very difficult, if not impossible, for the hand to change from one to the other.

In view of the foregoing, it is a general object of the present invention to provide a device which is fitted with a single hand crank operable to perform both of said operations thereby making it possible to retain the hand on the crank at all times and so to maintain the line under perfect control. It is a further object to provide a device in which the chain of gears conventionally employed may be omitted thereby considerably to simplify and cheapen the manufacture of the device and to render it more sturdy and less apt to wear out or get out of order.

This and other objects of the invention will be better understood upon perusal of the following detailed description and by referring to the accompanying drawings, of which:

Fig. 1 is a general view of a fishing reel embodying the invention and with a portion thereof broken away in order to disclose the interior mechanism;

Fig. 2 is a detail view of portions of the brake mechanism of Figure 1;

Fig. 3 is a fragmentary cross-sectional end view of the spool of the device taken substantially through the center thereof;

Figs. 4 and 5 are fragmentary views illustrating modifications of certain portions of the reel as is hereinafter fully explained; and Figs. 6 to 10 illustrating further modifications of the brake mechanism of the device.

Referring in the first instance to Fig. 1, the numerals 1 and 2 denote the end plates of a conventional fishing reel in which a shaft 3 is seated to rotate and it is fitted at one end thereof with a hand crank 4. A spool 5 is mounted on a shaft for rotation relative thereto and it is fitted with flanges 6 and 7 of any conventional size and shape.

The shaft 3 is intermediate the flanges of the spool shown reduced to form an eccentric crank portion 8 on which a cylindrical sleeve 9 is mounted to rotate. This sleeve is seated for axial sliding movement within a cylindrical shell 10 and the latter is fitted to rotate on the main portion of the shaft 3 on each side of the crank 8. A brake shoe 11 is tightly seated in one end of the sleeve 9 and this brake shoe normally takes its position in close proximity to the inner surface of the spool 5. For convenience in assembling, the lower end of the sleeve 9 is, at 12, shown slotted and a small bracket 13 is placed within the sleeve to ride against the crank 8 thereby to maintain the sleeve properly positioned on the crank. This substantially completes the construction of a very simple and sturdy reel.

In the position shown in Fig. 3, it is noticed that the crank 8 is placed below and at the left side of the shaft center a distance from the left wall of the slot 12; also that the crank touches the right side wall of this slot. This arrangement is essential to successful operation of the reel. When the shaft is rotated clockwise, as indicated in Fig. 3, it is noticed that the crank 8 will move upward thereby to elevate the sleeve within the shell sufficiently to cause the brake shoe 11 to contact and to press against the inner surface of the spool 5, the slight clearance between the crank and the left side wall of the sleeve permitting of such operation. If, on the other hand, it is attempted to turn the shaft counter-clockwise, it is found that the crank will be jammed tightly against the right side wall of the slot to prevent such counter-clockwise rotation of the shaft. The moment the brake shoe reaches the inner surface of the spool, it commences to apply frictional pressure thereagainst to check rotation of the spool in counter-clockwise direction such as will occur when a fish commences to pull on the line. It is found that a very slight pressure on the hand crank 4 suffices to slow down rotation of the spool and that this pressure may be increased as the pull of the line increases further to slow down the reel or bring it to a complete stop. The manipulation of this rotation control mechanism is continued until the fish on the hook ceases to pull on the line, which thereupon may be rewound on the spool by merely resuming rotation of the shaft in clockwise direction.

The shell 10 and the mechanism contained therein are normally free to rotate on the crank of the shaft and because the portion of this mechanism on the side of the crank which includes the shoe 11 projects further and is heavier than the portion thereof on the other side of the crank center, the tendency of the mechanism is to swing downward into a pendent position. It is, however, immaterial in which position the mechanism may be found at the time the shaft is rotated clockwise since it is found that such rotation causes the shoe instantly to contact and press against the inner surface of the spool. A very light and sensitive spring 14 is mounted on the sleeve 9 in position to bear against the lower edge of the shell 10 for the purpose normally of maintaining the brake shoe in retracted position and so to prevent vibration of shocks from causing the brake shoe to move into contact with the spool.

It was above stated that one of the objects of the invention is to eliminate the chain of gears ordinarily used between the hand crank and the reel shaft for the purpose of speeding up the rotation of the shaft relative to the crank. In conventional types of reels the diameter of the spool is so small that such speed increasing means is necessary but where the spool is made with large diameter as in the present case, it is found that such gearing is not absolutely essential. However, if preferred, it is of course possible to place any conventional form of gearing between the hand crank and the shaft.

The device of Figs. 4 and 5 is added in order to illustrate the possibility of providing a plurality of brake shoes in cases where it is required to exert considerable pressure against the brake drum. A shell 20 is, in this case, perforated to ride on the shaft 3 and a strap 21 is fitted to straddle the crank 8 of the shaft. The shell is at its upper end provided with a pair of lugs 22 and 23, in which brake levers 24 and 25 are pivotally hung. The inner ends of these levers overlap each other and are provided with slots in which a stud 26 of the strap 21 is seated. In this case, it is noticed that the crank 8 is positioned to draw the strap downward in response to clockwise rotation of the shaft and that space is provided at the right side of the strap to permit such movement, but that rotation of the shaft in the opposite direction is prevented by the left side edge of the strap contacting the inner wall of the shell.

When the parts are so arranged and proportioned, it is found that clockwise rotation of the shaft results in downward movement of the strap and that this movement causes the levers to swing on their pivots to bring the shoe portions thereof into contact with the inner surface of the spool. Where the distance from the brake lever pivots to the pin 26 is greater than the distance from the pivots to the shoe portions thereof, it is found that the relatively longer movement of the strap results in more powerful pull on the levers to cause the brake shoes more firmly to apply pressure against the spool and that on account of this longer movement and the corresponding increased rotation of the reel shaft, more sensitive operation of the device is obtained. In this case it will not be required to mount a retaining plate on the strap since the shape thereof will retain it properly positioned on the crank 8.

In all of the foregoing devices the pressure of the brake shoe or brake shoes has been directed against the inner surfaces of the spool, the result being that the brake action against the spool is quick and very powerful, necessitating great caution in operating the hand crank of the reel. This condition may, in some cases, be found objectionable and it may be found advantageous to apply the pressure closer to the axis of the shaft. A structure embodying this feature is illustrated in Figs. 6 and 7. The shaft 3 and crank 8 may also in this case remain unchanged, but an annular partition 35 is rigidly mounted within the spool intermediate the ends thereof. This partition is formed with a flange 36 which extends axially in one direction to form the brake drum of the device. A frame 37 is mounted for rotation on the crank 8 and it is fitted on one side thereof with a brake shoe 38 as in the above described devices. This frame is slotted as indicated at 39 for convenient mounting on the crank of the shaft. It is fitted with a bracket 40 engaging the surface of the shaft and is suitably secured to the frame 37 to maintain the brake shoe properly positioned relative to the brake drum. A slight clockwise turning movement of the shaft causes the shoe 38 to engage the surface 36, but rotation in the opposite direction is prevented by a projection 40 of the bracket engaging the main portion of the shaft 3. As stated, the advantage of this type of construction is that the brake drum can be made of comparatively small diameter thereby to ease the pressure of the brake shoe thereagainst and that for this reason not so great care need be exercised in the operation of the hand crank. In all other respects this device may remain substantially like the above described devices and it will function in the same manner.

In the modification of Figs. 9 and 10, the spool shaft 45 is recessed at one end thereof to receive a plunger 46 and a pin 47 is transversely extended through this plunger. The shaft is made with a perforation 48 through which the pin freely projects. A pair of resilient brackets 49, 50 are rigidly secured to the shaft to support brake shoes 51, 52, and bifurcated frames 53, 54, riding on the pin 47 are fitted at their ends pivotally to connect with the brackets 49, 50.

A housing 55 is secured to the outer end of the shaft 45 in which a hand crank 56 is journalled at 57. This crank extends through a slot 58 and bears against the outer end of the plunger 46. When it is desired to apply the brake to the spool to retard or stop unwinding rotation thereof it is required to swing the crank on its journal within the housing to exert pressure against the end of the plunger. This pressure causes the plunger to slide inward, thereby to swing the brackets 53, 54 to cause the frames 49, 50 to spread until the brake shoes contact the inner wall of the spool. When subsequently it is desired to rewind the line on the spool, it is merely required to rotate the crank in the right direction, while at the same time maintaining sufficient pressure against the end of the plunger to lock the parts together for simultaneous movement. A spring 59 is seated behind the plunger to urge this part back into projected position.

I claim:

1. The combination with a fishing reel having a frame and a spool rotatable in said frame, of a shaft seated for rotation in the frame and freely extending through said spool, a plunger axially movable within said shaft and projecting beyond one end thereof, a pair of brackets rigidly secured to said shaft, brake shoes on said brackets in close proximity to the inner surface of the spool, a pin transversely seated near the inner end of said plunger and freely extending through said shaft, frames hung on said pin and having the outer ends thereof pivotally secured to the ends of said brackets, a hand crank for rotating said shaft, said crank being hung on the end of the shaft adjacent the projecting end of said plunger for limited axial movement relative to the shaft and plunger, the crank being manually operable to move said plunger inwardly thereby to swing said frames on the said pin and to spread the said brackets apart thereby to cause the brake shoes to contact the inner surface of the spool.

2. The combination with a fishing reel having a frame and a spool rotatable in said frame, of a shaft seated for rotation in the frame and freely extending through said spool, a plunger axially movable within said shaft and projecting beyond one end thereof, a pair of brackets rigidly secured to said shaft, brake shoes on said brackets in close proximity to the inner surface of the spool, a pin transversely seated near the inner end of said plunger and freely extending through said shaft, frames hung on said pin and having their outer ends pivotally secured to the ends of said brackets, a hand crank for rotating said shaft, said crank being hung on the end of the shaft adjacent the projecting end of said plunger for limited axial movement relative to the shaft and plunger, the crank being manually operable to move said plunger inwardly thereby to swing said frames on the said pin and to spread the said brackets apart thereby to cause the brake shoes to contact the inner surface of the spool, and resilient means urging the said plunger outward.

3. The combination with a fishing reel having a frame and a spool rotatable in said frame, of a shaft seated for rotation in the frame and freely extending through said spool, said shaft having a transverse perforation therethrough, a plunger axially movable within said shaft and projecting beyond one end thereof, a pair of brackets rigidly secured to said shaft, lugs on said brackets, brake shoes on said brackets in close proximity to the inner surface of the spool, a pin transversely seated near the inner end of said plunger and freely extending through the perforation of said shaft, frames hung on said pin and having their outer ends pivotally secured to the lugs of said brackets, a hand crank pivotally mounted on the end of said shaft for limited axial movement relative to the shaft and the projecting end of the plunger, sidewise pressure causing said crank to swing on its pivot to contact and to move said plunger and its pin inwardly within the limits of the shaft perforation, thereby to swing said frames on the said pin and to spread the said brackets apart thereby to cause the brake shoes to contact the inner surface of the spool, and resilient means urging the said plunger outward.

4. The combination with a fishing reel having a frame and a spool rotatable in said frame, a shaft seated for rotation in the frame and freely extending through said spool, a plunger axially movable within said shaft and projecting beyond one end thereof, a hand crank pivotably secured to the end of the shaft adjacent the projecting end of the plunger for oscillation in the direction of the shaft axis, inward pressure against the crank being effective to move said plunger within the shaft, brake shoes on the shaft in close proximity to the inner surface of the spool, and means interconnecting the plunger with said brake shoes to move the latter against the spool surface in response to axial movement of the plunger.

5. The combination with a fishing reel having a frame and a spool rotatable in said frame, a shaft seated for rotation in the frame and freely extending through said spool, a plunger axially movable within said shaft and projecting beyond one end thereof, a hand crank pivotably secured to the end of the shaft adjacent the projecting end of the plunger for oscillation in the direction of the shaft axis, inward pressure against the crank being effective to move said plunger within the shaft, resilient means urging outward movement of the plunger, brake shoes on the shaft in close proximity to the inner surface of the spool, and means interconnecting the plunger with said brake shoes to move the latter against the spool surface in response to axial movement of the plunger.

ROBERT C. SWIGERD.

REFERENCES CITED

The following references are of record in the file of this patent:

UNITED STATES PATENTS

| Number | Name | Date |
|---|---|---|
| 929,867 | Meisselbach et al. | Aug. 3, 1909 |
| 2,233,208 | Griswold | Feb. 25, 1941 |
| 2,282,995 | Dumond | May 12, 1942 |